United States Patent
Mendik et al.

(10) Patent No.: US 6,198,039 B1
(45) Date of Patent: Mar. 6, 2001

(54) PIPELINE SECTION OF A GAS-INSULATED PIPELINE

(75) Inventors: Michael Mendik, Wadenswil; Bodo Bruhl, Kunten, both of (CH); Thomas Worzyk, Rodeby (SE)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/311,645

(22) Filed: May 14, 1999

(30) Foreign Application Priority Data

May 15, 1998 (DE) .............................................. 198 21 888

(51) Int. Cl.$^7$ ........................................................ H02G 5/06
(52) U.S. Cl. ................................................................. 174/28
(58) Field of Search ........................... 174/28, 16.1, 16.2

(56) References Cited

U.S. PATENT DOCUMENTS

| | | | |
|---|---|---|---|
| 3,864,507 | * | 2/1975 | Fox et al. ............................. 174/28 X |
| 3,996,414 | * | 12/1976 | Artbauer et al. ........................ 174/28 |
| 4,018,978 | | 4/1977 | Bacvarov et al. ...................... 174/28 |
| 4,132,855 | | 1/1979 | Clark et al. ............................. 174/28 |
| 4,160,119 | | 7/1979 | Artbauer ................................ 174/28 |
| 4,415,763 | * | 11/1983 | Cookson ................................ 174/28 |
| 5,571,989 | * | 11/1996 | Thuries et al. ..................... 174/28 X |

FOREIGN PATENT DOCUMENTS

| | | |
|---|---|---|
| 2347927C3 | 7/1981 | (DE) . |
| 0789438A2 | 8/1997 | (EP) . |
| 1073606 | 6/1967 | (GB) . |

* cited by examiner

Primary Examiner—Kristine Kincaid
Assistant Examiner—Chau N. Nguyen
(74) Attorney, Agent, or Firm—Burns, Doane, Swecker & Mathis, L.L.P.

(57) ABSTRACT

The pipeline section of the gas-insulated pipeline has an insulating gas-filled encapsulation including a polymer pipe. A current conductor is arranged inside the capsule pipe and extends parallel to the latter's axis and is supplied with a high voltage. This current conductor is retained by insulators that rest on the inside surface of the capsule pipe. At least one of a plurality of post insulators has a support ring resting on the mantle surface of the current conductor. At least three evenly distributed and hollow support elements are molded peripherally in a star shape on the support ring, each of which has transversely to a longitudinal axis a profile that is constructed in the shape of an arch or trapezoid. The support elements each have a shell-shaped foot. Each shell-shaped foot has a thickness (d) which is smaller than a distance (a) between the current conductor and the inside surface of the capsule pipe and smaller than a length (l) in an axial direction of the capsule pipe. At least two of the feet rest on the inside surface of the capsule pipe. This keeps the electric field strength in the gaps between the post insulators and the inside surface of the polymer capsule pipe at a minimum and thus optimizes the di-electric stability of the pipeline section.

14 Claims, 2 Drawing Sheets

PIPELINE SECTION OF A GAS-INSULATED PIPELINE

FIELD OF THE INVENTION

The present invention relates to a pipeline section of a gas-insulated pipeline. Gas-insulated pipelines are used advantageously in population centers since they are installed underground and can be created or expanded without any significant negative influence on the traffic, water and gas supply and sewer infrastructure.

BACKGROUND OF THE INVENTION

A pipeline section of a gas-insulated pipeline is known, for example, from patent document 0 789 438 A2. This document describes a pipeline section of a gas-insulated pipeline in which a high voltage-conducting current conductor is arranged in a pipe that is filled with compressed $SF_6$ and is made from an insulating material, typically polyethylene. The insulating pipe carries on its mantle surface a layer that is field-controlling and, if needed, conducts any occurring return current and is comprised of a conductive or semi-conductive material. The high voltage-conducting current conductor is constructed in tubular form and is arranged centrically in the capsule pipe by means of post insulators. The post insulators may include insulation legs that are aligned radially or are constructed as an isosceles triangle which are kept in one of several longitudinal grooves undercut in the mantle surface of the current conductor. Because of the current conductor that is undercut and provided with longitudinal grooves and the post insulators that are comprised of a high number of insulation legs, such a pipeline section is relatively complicated.

U.S. Pat. No. 4,018,978 A and U.S. Pat. No. 4,132,855 A describe post insulators for a high voltage-conducting current conductor of a metal-capsulated, gas-insulated pipeline, each of which support themselves via support arches or with a support ring on the inside surface of the capsule.

SUMMARY

The invention relates to a pipeline section of a gas-insulated pipeline which is characterized by good di-electric properties and at the same time can be produced in a simple and cost-efficient manner.

In the pipeline section according to the invention, only a relatively small part of the material of the post insulators reaches up near the capsule pipe. Because of this small amount of material with a di-electricity constant that is higher than that of the insulating gas, relatively small electric field intensities occur in gaps between the inside surface of the capsule pipe and the outer surfaces of the support elements of the post insulators. For this reason, and because the post insulators are also arranged practically without an edge at the inside surface of the capsule pipe, di-electric weak points in the area of the capsule pipe are substantially avoided.

In the pipeline section according to the invention, the encapsulation is constructed as a capsule pipe on the one side, and the current conductor and post insulators on the other side, first can be manufactured as systems that are separated from each other. Since the encapsulation is first empty during the assembly of the pipe section, it can be produced without much expenditure by welding capsule pipe sections to each other. The welding seams formed in the process are easily finished and can be easily checked for tightness and strength. In addition, the encapsulation produced in this manner can be easily cleaned before the current conductor and post insulators are installed, e.g. with a robot. Then the current conductor and the post insulators can be pulled into the encapsulation. It is hereby a special advantage that the friction between the post insulators and the capsule is kept low by a suitable shaping of the post insulators, and/or that the diameter of the capsule pipe can be greater than the diameter of the post insulator, since the pulling can then be performed with little force. Because of the low friction and small diameter of the post insulators, the generation of a di-electrically undesirable abrasion is also avoided during assembly and during operation.

For this reason also, the pipeline section displays a favorable di-electric behavior. In addition, the arch- and trapezoid-shaped construction of the support elements resting on the post insulators cause the support forces to be exerted in a favorable manner on the encapsulation, so that there is practically no danger that the load of the post insulators on the capsule pipe is too high which could possibly deform it. Due to the arch- or trapezoid-shaped design of the support elements, the cantilever strength of the post insulators is at the same time increased significantly, and in this way negative effects on the di-electric properties of the pipeline section are avoided.

An electrode, which may be arranged in the inside surface of the support ring of each of the post insulators, is able to di-electrically discharge the triple points (common to current conductor, post insulator and insulating gas) without any problems.

BRIEF DESCRIPTION OF DRAWINGS

Two preferred exemplary embodiments of the invention and the additional advantages that can be achieved with them will be described in more detail below in reference to drawings. In the drawings.

DESCRIPTION OF THE PREFERRED EMBODIMENTS

Figure 1:
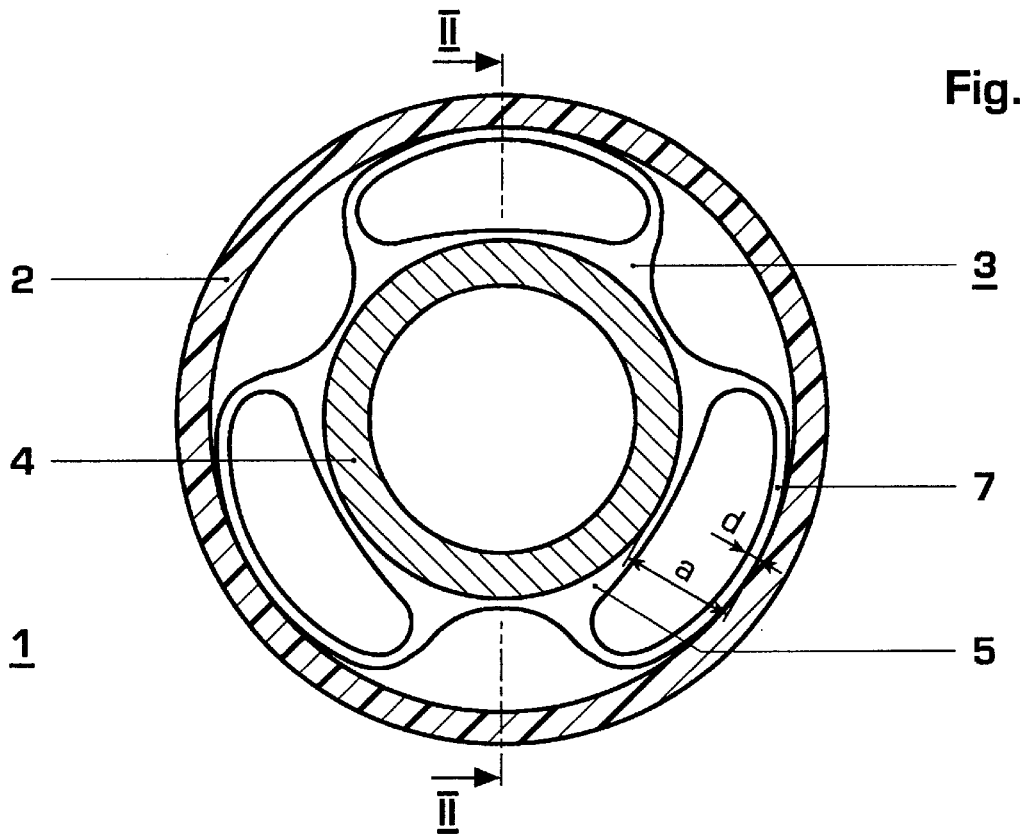
FIG. 1 shows a top view of a radial section through a first embodiment of a pipeline section according to the invention.

The same reference symbols are used in all drawings for parts having the same function. The pipeline section of a gas-insulated pipeline 1 shown in FIGS. 1 and 2 has an encapsulation including a pipe 2. Inside the pressure pipe are arranged post insulators 3, of which only one post insulator 3 is shown, as well as a tubular current conductor 4 of a three-phased or direct current power network with net voltages of up to several hundred kV each that extend essentially parallel to the axis of the pipe and carry a high voltage potential.

The capsule pipe 2 is filled with an insulating gas, such as $SF_6$, of up to several bars of pressure, and includes an insulating material, whereby a thermoplastic polymer is used as material for the insulating material. The thermoplastic may be filled with an electrically conductive material, for example soot, since this, on the one hand, effectively shields the gas-insulated pipeline 1 electrostatically towards the outside, and on the other hand associates the capsule pipe with a defined potential, for example, in particular a earth potential.

The capsule pipe 2 consists of easily transportable pipe sections, for example with a length of 10 to 20 m each, which are welded to each other at their end faces. The capsule pipe material is advantageously a non-cross-linked thermoplast. This means it can be well shaped and welded at higher temperatures. A suitable thermoplastic material is, for example, a non-cross-linked, high-density polyethylene. The mantle surface of the capsule pipe 2 also has a non-designated, potential-controlling layer, preferably of a conductive or semi-conductive material. This layer provides the mantle surface of the capsule pipe 2 with an earth potential. Depending on the requirement for the pipeline section, the previously mentioned functions may possibly be performed by the layer or filling of the thermoplastic material with the conductive material.

Each of the post insulators include a support ring 5 fixed onto the mantle surface of the current conductor 4. The support ring 5 has on its inside surface facing the mantle surface of the current conductor 4 at least one electrode 6 that has, by way of a contact with the mantle surface of the current conductor 4, the latter's potential and is preferably constructed in a ring shape and di-electrically discharges the triple points common to current conductors 4, post insulator 3 and insulating gas.

Three hollow support elements are evenly distributed along the periphery and each support element has, transversely to the axis, a profile that is constructed in the manner of an arch, molded in a star shape to the support ring 5. The support elements each have two legs 11 and 12 that attach to the support ring 5 in a manner initially peripherally offset relative to each other and extending mostly radially, and which are integrated with opposite curvatures in a foot 7. The foot 7 generally rests on the inside surface of the capsule pipe 2, but may also be separated from it by a gap that is not visible in the drawing. At least two of the feet rest on the inside surface of the capsule pipe 2. Each of the feet 7 has, relative to the distance a between the current conductor 4 and the inside surface of the capsule pipe 2, a small thickness d, is constructed in a shell shape, and has, relative to the thickness d, a large length l in axial direction. This construction of the post insulator 3 results in a high mechanical stability of the pipeline section since the feet 7 will be able to rest with a large area on the inside surface of the capsule pipe 2 and in this way exert a large clamping force with a relatively low surface pressure. In this way the capsule pipe 2 which consists of a relatively easily deformable material is able to largely maintain its geometrical dimensions when the pipeline section is used. In order to avoid deformations or a cantilevering of the post insulator 3 it is useful that the support ring 5 and the feet 7 be shaped from a thermally and mechanically high-stressable thermoplastic polymer, preferably a polysulfone.

By constructing the post insulator 3 with thin, shell-shaped feet 7, it can be achieved that relatively little insulating material with a di-electric constant that is large in comparison with the insulating gas is passed to the inside surface of the capsule pipe 2. In contrast to post insulators according to the state of the art which have edges or tips resting on the wall or are guided against the inside of the capsule pipe with a large amount of material, the electric field intensity in the gaps between the post insulator and the inside surface of the capsule pipe is minimized, and the di-electric strength of the pipeline section according to the invention is optimized.

Depending on the post insulator's 3 dimensions, four or more feet 7 can be molded to the support ring 5 instead of three. As can be seen in FIG. 1 the feet may be constructed essentially in the manner of an ellipsis, but they may also have a circle or parabolic shape.

The post insulator 3 is inversely symmetrical to a plane 8 that is vertical to the pipe axis. It can be easily produced by injection molding. It is hereby an advantage to form the electrode 6 from an electrically conductive plastic, since the electrode 6 then also can be produced by injection molding.

Figure 2:
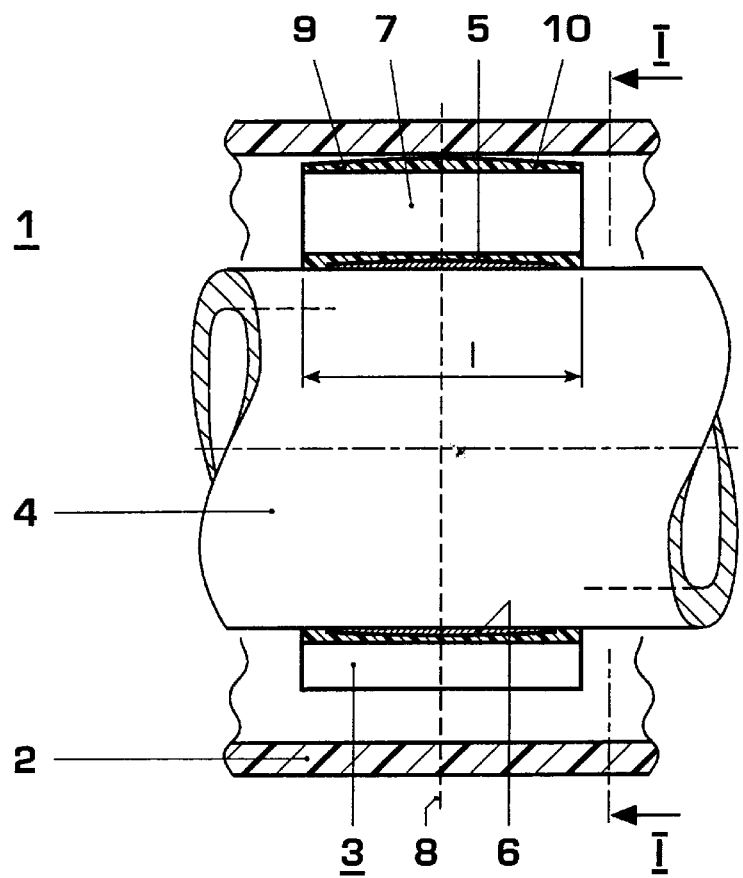
FIG. 2 shows a top view in arrow direction of a section longitudinally to II—II through the pipeline section according to FIG. 1.
Figure 3:
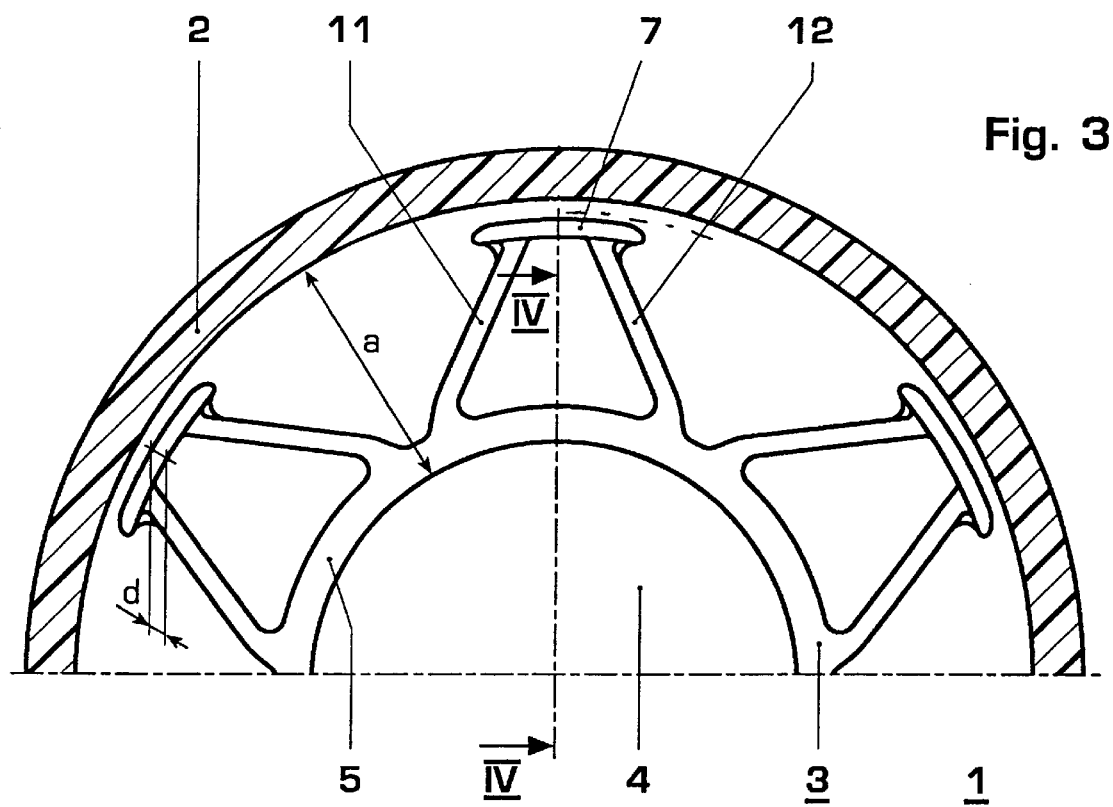
FIG. 3 shows a top view of a radial section through the top half of a second embodiment of the pipeline section according to the invention.
Figure 4:
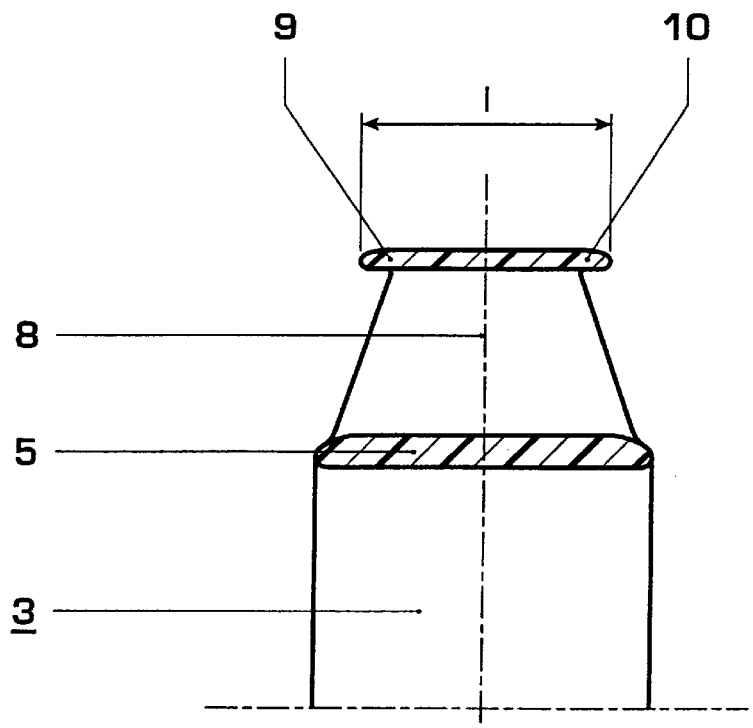
FIG. 4 shows a top view in arrow direction of a section longitudinally to IV—IV through a post insulator of the pipeline section according to FIG. 3.

In the embodiment according to FIGS. 3 and 4, the current conductor 4 passes through the support ring 5 and, the control electrode provided in the embodiment according to FIGS. 1 and 2 is not shown. Six hollow support elements that have a profile in the manner of a trapezoid are molded transversely to the capsule pipe axis in a star shape to the support ring 5. The trapezoid has two legs 11, 12 that attach to the support ring 5 in a manner initially peripherally offset relative to each other, at an angle to each other, and mostly radially and then tangentially extending. This support element is also able to absorb large support forces with a small mass. The fact that the foot 7 extends peripherally over the legs 11, 12, causes the force transferred from the current conductor to the capsule pipe 2 to be distributed over a large surface, and the capsule pipe 2 thus receives only a small surface pressure. According to the embodiment according to FIGS. 1 and 2, each of the feet 7 has, relative to the distance a between the current conductor 4 and the inside surface of the capsule pipe 2, a small thickness d and has, relative to the thickness d, a large length l in axial direction.

In this support element the feet are provided also with two each end sections 9, 10 that are set apart from each other in the direction of the pipe axis and each of which is bent up in the manner of a sled skid relative to the inside surface of the capsule pipe 2 and according to the embodiment of FIGS. 1 and 2 facilitate the introduction of the post insulator 3 into the capsule pipe and reduce the undesirable abrasion of the material.

As can be seen from FIG. 3, the feet 7 of the three shown support elements are separated by a larger or smaller gap from the inside surface of the capsule pipe 2, whereas at least two of the feet of the three lower support elements not shown rest on the inside surface. The diameter of the capsule pipe 2 is therefore larger than the diameter of the post insulator 3. The post insulator 3 therefore can be inserted almost without force and free of any abrasion into the capsule pipe.

By constructing the post insulator 3 with thin, shell-shaped feet 7, relatively little insulating material with a di-electric constant that is large in relation to the insulating gas extends the inside surface of the capsule pipe 2. This optimizes the electric field intensity in the larger or smaller gaps between the post insulator and the inside surface of the capsule pipe and the electric strength of the conductor section according to the invention.

List of Reference Symbols 1 gas-insulated pipeline
2 capsule pipe
3 post insulators
4 current conductor
5 support ring
6 electrode
7 leg
8 plane 9,10 end sections 11,12 legs

What is claimed is:

1. A pipeline section of a gas-insulated pipeline with an insulating gas-filled encapsulation comprising: a polymer capsule pipe with a current conductor arranged inside the capsule pipe and extending substantially parallel to a longitudinal axis of the capsule pipe and supplied with a high voltage, a plurality of post insulators supporting the current conductor and resting on an inside surface of the capsule pipe, at least one of the post insulators including a support ring resting on a mantle surface of the current conductor and at least three evenly distributed and hollow support elements being molded peripherally in a star shape on the support ring, each of the hollow support elements having, transversely to the axis, a profile that is in the shape of an arch having a shell-shaped foot, each shell-shaped foot having a thickness (d) and an axial length (l), the thickness (d) being smaller than a distance (a) between the current conductor and the inside surface of the capsule pipe and smaller than the length (l), wherein at least two of the feet rest on the inside surface of the capsule pipe, and wherein each of the support elements includes two legs that attach peripherally offset relative to each other on the support ring and are integrated with opposite curvatures in the foot.

2. The pipeline section as claimed in claim 1, wherein the post insulators are injection molded.

3. The pipeline section as claimed in claim 2, wherein the post insulators are made of a thermally and mechanically high-stressable thermoplastic polymer.

4. The pipeline section as claimed in claim 3, wherein the thermoplastic polymer is a polysulfone.

5. The pipeline section as claimed in claim 1, wherein the support ring on its inside surface that faces the mantle surface of the current conductor has at least one electrode that is guided on the potential of the current conductor and is made of electrically conductive plastic material.

6. The pipeline section as claimed in claim 1, wherein a diameter of the capsule pipe is larger than a diameter of the post insulators.

7. The pipe section as claimed in claim 1, wherein each foot has two end sections that are set apart from each other in the direction of the longitudinal capsule pipe axis and each end section is bent relative to the inside surface of the capsule pipe.

8. A pipeline section of a gas-insulated pipeline with an insulating gas-filled encapsulation comprising: a polymer capsule pipe with a current conductor arranged inside the capsule pipe and extending substantially parallel to a longitudinal axis of the capsule pipe and supplied with a high voltage, a plurality of post insulators supporting the current conductor and resting on an inside surface of the capsule pipe, at least one of the post insulators including a support ring resting on a mantle surface of the current conductor and at least three evenly distributed and hollow support elements being molded peripherally in a star shape on the support ring, each of the hollow support elements having, transversely to the longitudinal axis, a profile that is in the shape of a trapezoid having a shell-shaped foot, each shell-shaped foot having a thickness (d) and an axial length (l), the thickness (d) being smaller than a distance (a) between the current conductor and the inside surface of the capsule pipe and smaller than the length (l), wherein at least two of the feet rest on the inside surface of the capsule pipe and wherein each of the support elements has two legs holding the foot that attach peripherally offset relative to each other on the support ring and are angled relative to each other and each foot extends peripherally over the legs.

9. The pipeline section as claimed in claim 8, wherein each foot has two end sections that are set apart from each other in the direction of the longitudinal capsule pipe axis and each end section is bent relative to the inside surface of the capsule pipe.

10. The pipeline section as claimed in claim 8, wherein the post insulators are injection molded.

11. The pipeline section as claimed in claim 10, wherein the post insulators are made of a thermally and mechanically high-stressable thermoplastic polymer.

12. The pipeline section as claimed in claim 11, the thermoplastic polymer is a polysulfone.

13. The pipeline section as claimed in claim 8, wherein the support ring on its inside surface that faces the mantle surface of the current conductor has at least one electrode that is guided on the potential of the current conductor and is made of electrically conductive plastic material.

14. The pipeline section as claimed in claim 8, wherein a diameter of the capsule pipe is larger than a diameter of the post insulators.

* * * * *